(12) United States Patent
Mohan et al.

(10) Patent No.: US 12,074,906 B1
(45) Date of Patent: Aug. 27, 2024

(54) SYSTEM AND METHOD FOR RANSOMWARE EARLY DETECTION USING A SECURITY APPLIANCE AS DEFAULT GATEWAY WITH POINT-TO-POINT LINKS BETWEEN ENDPOINTS

(71) Applicant: AIRGAP NETWORKS INC., Santa Clara, CA (US)

(72) Inventors: Satish M. Mohan, San Jose, CA (US); Vinay Adavi, Sunnyvale, CA (US); Ritesh R. Agrawal, San Jose, CA (US)

(73) Assignees: AIRGAP Networks Inc., Santa Clara, CA (US); Zscaler, Inc., San Jose, CA (US)

( * ) Notice: Subject to any disclaimer, the term of this patent is extended or adjusted under 35 U.S.C. 154(b) by 0 days.

(21) Appl. No.: 18/529,621

(22) Filed: Dec. 5, 2023

Related U.S. Application Data

(63) Continuation-in-part of application No. 18/346,078, filed on Jun. 30, 2023, which is a continuation-in-part of application No. 18/064,177, filed on Dec. 9, 2022, now Pat. No. 11,916,957, which is a continuation-in-part of application No. 17/521,092, filed on Nov. 8, 2021, which is a continuation of application No. 17/387,615, filed on Jul. 28, 2021, now Pat. No. 11,323,474, and a continuation of application No. 17/357,757, filed on Jun. 24, 2021, now Pat. No. 11,171,985.

(51) Int. Cl.
*H04L 9/40* (2022.01)
*H04L 12/46* (2006.01)

(52) U.S. Cl.
CPC ...... *H04L 63/1466* (2013.01); *H04L 12/4641* (2013.01); *H04L 63/1416* (2013.01)

(58) Field of Classification Search
None
See application file for complete search history.

(56) References Cited

U.S. PATENT DOCUMENTS

| | | |
|---|---|---|
| 6,611,925 B1 | 8/2003 | Spear |
| 6,914,905 B1 | 7/2005 | Yip et al. |
| 8,055,800 B1 | 11/2011 | Bardzil et al. |
| 8,312,270 B1 | 11/2012 | Chou |

(Continued)

FOREIGN PATENT DOCUMENTS

| | | |
|---|---|---|
| CA | 2826385 A1 | 8/2012 |
| CN | 109450959 A | 3/2019 |

(Continued)

OTHER PUBLICATIONS

Thapa, Manish, "Mitigating Threats in IoT Network Using Device Isolation", Maste• s Thesis, Feb. 4, 2018, 73 pgs.

(Continued)

*Primary Examiner* — Christopher C Harris
(74) *Attorney, Agent, or Firm* — Baratta Law PLLC; Lawrence A. Baratta, Jr.

(57) ABSTRACT

A technique to provide early detection of ransomware is disclosed. Message traffic from secure gateways is monitored. Statistical anomaly detection and behavioral anomaly detection is performed. Visualization and alerts may be generated to aid operators to identify ransomware attacks and take proactive measures. In one implementation, the early detection of ransomware is performed in the cloud.

16 Claims, 14 Drawing Sheets

(56) References Cited

U.S. PATENT DOCUMENTS

| | | |
|---|---|---|
| 8,347,349 B1 | 1/2013 | Wilson |
| 8,683,052 B1 | 3/2014 | Brinskelle |
| 8,850,185 B1 | 9/2014 | Vaughn |
| 8,869,259 B1 | 10/2014 | Udupa |
| 9,225,736 B1 | 12/2015 | Roundy |
| 9,282,114 B1 | 3/2016 | Dotan |
| 9,306,965 B1 | 4/2016 | Grossman et al. |
| 9,602,529 B2 | 3/2017 | Jones et al. |
| 9,712,504 B2 | 7/2017 | Kurmala |
| 9,756,061 B1 * | 9/2017 | Roeh .................. H04L 63/1408 |
| 10,298,599 B1 | 5/2019 | Zhang |
| 10,454,950 B1 | 10/2019 | Aziz |
| 11,030,311 B1 | 6/2021 | Lopez |
| 11,093,139 B1 | 8/2021 | Karr et al. |
| 11,171,985 B1 | 11/2021 | Agrawal |
| 11,240,242 B1 | 2/2022 | Celik |
| 11,252,183 B1 | 2/2022 | Agrawal |
| 11,303,669 B1 | 4/2022 | Agrawal |
| 11,303,673 B1 | 4/2022 | Agrawal |
| 11,323,474 B1 | 5/2022 | Agrawal |
| 11,374,964 B1 | 6/2022 | Agrawal |
| 11,818,176 B1 * | 11/2023 | Wu ........................ H04L 63/30 |
| 2003/0212907 A1 | 11/2003 | Genty |
| 2006/0028996 A1 | 2/2006 | Huegen |
| 2007/0101432 A1 | 5/2007 | Carpenter |
| 2008/0184157 A1 | 7/2008 | Selig |
| 2009/0217346 A1 | 8/2009 | Manring |
| 2009/0328209 A1 | 12/2009 | Nachenberg |
| 2010/0281159 A1 | 11/2010 | Boscolo |
| 2012/0079122 A1 | 3/2012 | Brown |
| 2013/0298242 A1 | 11/2013 | Kumar |
| 2014/0020053 A1 | 1/2014 | Kay |
| 2014/0059642 A1 | 2/2014 | Deasy |
| 2015/0281172 A1 | 10/2015 | He |
| 2016/0197962 A1 | 7/2016 | Winn |
| 2016/0323318 A1 | 11/2016 | Terrill et al. |
| 2017/0039310 A1 | 2/2017 | Wang |
| 2017/0085530 A1 | 3/2017 | Volkov |
| 2017/0093910 A1 | 3/2017 | Gukal |
| 2017/0149775 A1 | 5/2017 | Bachar et al. |
| 2017/0289134 A1 | 10/2017 | Bradley |
| 2017/0289191 A1 | 10/2017 | Thioux |
| 2017/0339190 A1 | 11/2017 | Epstein |
| 2017/0339250 A1 | 11/2017 | Momchilov |
| 2017/0344743 A1 | 11/2017 | Shi |
| 2018/0013788 A1 | 1/2018 | Vissamsetty |
| 2018/0097840 A1 | 4/2018 | Murthy |
| 2018/0124085 A1 * | 5/2018 | Frayman ................. H04L 63/20 |
| 2018/0189508 A1 | 7/2018 | Li |
| 2018/0324201 A1 | 11/2018 | Lowry |
| 2019/0116193 A1 | 4/2019 | Wang |
| 2019/0166152 A1 | 5/2019 | Steele |
| 2019/0245831 A1 | 8/2019 | Petit |
| 2019/0253432 A1 | 8/2019 | Ohtani |
| 2019/0312836 A1 | 10/2019 | Phillips |
| 2019/0332765 A1 | 10/2019 | Fu |
| 2020/0137110 A1 | 4/2020 | Tyler |
| 2020/0145416 A1 | 5/2020 | Mitzimberg |
| 2020/0228547 A1 | 7/2020 | Kottapalli |
| 2020/0356664 A1 | 11/2020 | Maor |
| 2020/0404007 A1 * | 12/2020 | Singh ................ G06F 16/24537 |
| 2021/0058395 A1 | 2/2021 | Jakobsson |
| 2021/0136037 A1 | 5/2021 | Balasubramaniam |
| 2021/0152595 A1 * | 5/2021 | Hansen ................ G06F 21/568 |
| 2021/0160275 A1 * | 5/2021 | Anderson ................ G06N 5/04 |
| 2021/0194894 A1 * | 6/2021 | Anderson ........... H04L 63/1408 |
| 2021/0218770 A1 | 7/2021 | Ben-Yosef |
| 2021/0264233 A1 | 8/2021 | Gronat |
| 2021/0273953 A1 * | 9/2021 | Fellows ................ G06F 21/554 |
| 2021/0280315 A1 | 9/2021 | Woldenberg |
| 2021/0336933 A1 | 10/2021 | Shah |
| 2021/0344667 A1 | 11/2021 | Huston, III |
| 2021/0400057 A1 | 12/2021 | Devane |
| 2022/0029965 A1 | 1/2022 | Chanak |
| 2022/0060498 A1 * | 2/2022 | Head, Jr. ............. H04L 12/4641 |
| 2022/0217133 A1 | 7/2022 | Montgomery |
| 2022/0217169 A1 | 7/2022 | Varanda |
| 2022/0229906 A1 | 7/2022 | Balek |
| 2022/0329585 A1 | 10/2022 | Chhabra |
| 2022/0360983 A1 | 11/2022 | Raman |
| 2022/0368689 A1 | 11/2022 | Ben-Noon |
| 2022/0393943 A1 | 12/2022 | Pangeni |
| 2022/0398321 A1 | 12/2022 | Baldwin |
| 2022/0408255 A1 | 12/2022 | Howe |
| 2023/0079444 A1 | 3/2023 | Parla |
| 2023/0247003 A1 * | 8/2023 | Chanak ................. H04L 9/3226 726/1 |
| 2023/0308458 A1 * | 9/2023 | Varsanyi ............. H04L 63/1408 |

FOREIGN PATENT DOCUMENTS

| | | |
|---|---|---|
| CN | 114143034 A | 3/2022 |
| CN | 115396230 A | 11/2022 |
| EP | 1844399 B1 | 6/2019 |
| TW | M623435 | 2/2022 |
| WO | 2005125084 A1 | 12/2005 |
| WO | 2008074621 A1 | 6/2008 |
| WO | 2016191376 A1 | 12/2016 |
| WO | 2018157247 A1 | 9/2018 |
| WO | 2021009645 A1 | 1/2021 |

OTHER PUBLICATIONS

International Search Report and Written Opinion for PCT/US2020/020593, mailed Apr. 15, 2020, 8 pgs.

International Preliminary Report on Patentability for PCT/US2020/020593, Completed May 18, 2021, 8 pgs.

* cited by examiner

SYSTEM AND METHOD FOR RANSOMWARE EARLY DETECTION USING A SECURITY APPLIANCE AS DEFAULT GATEWAY WITH POINT-TO-POINT LINKS BETWEEN ENDPOINTS

CROSS REFERENCE TO RELATED APPLICATIONS

This application is a continuation in part of U.S. patent application Ser. No. 18/346,078, filed Jun. 30, 2023, entitled "System and Method for Utilizing DHCP Relay to Accomplish Quarantining Client Endpoints in a Ransomware Protected Network", which is a continuation-in-part of U.S. patent application Ser. No. 18/064,177, filed Dec. 9, 2022, which is a continuation-in-part of U.S. patent application Ser. No. 17/521,092, filed Nov. 8, 2021, entitled "System and Method to Detect Lateral Movement of Ransomware by Deploying a Security Appliance Over a Shared Network to Implement a Default Gateway with Point-To-Point Links Between Endpoints", which is a continuation of U.S. patent application Ser. No. 17/357,757, filed Jun. 24, 2021, now issued as U.S. Pat. No. 11,171,985 on Nov. 9, 2021, entitled "System and Method to Detect Lateral Movement of Ransomware by Deploying a Security Appliance Over a Shared Network to Implement a Default Gateway with Point-To-Point Links Between Endpoints" and a continuation of U.S. patent application Ser. No. 17/387,615, filed Jul. 28, 2021, now issued as U.S. Pat. No. 11,323,474 on May 3, 2022, entitled "System and Method for Determining Endpoint Compatibility with Subnet Prefix of All Ones for Lateral Propagation Prevention of Ransomware", which are hereby incorporated by reference in their entirety.

FIELD OF THE INVENTION

The present disclosure generally relates to techniques for ransomware protection. Using security applicants acting as default gateways to provide lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high-profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

A technique of early ransomware detection is disclosed that include detection of behavioral anomalies and statistical anomalies in the network traffic of secure gateways supporting point-to-point links of endpoint client devices.

In one implementation, a smart appliance includes a DHCP relay function. The smart appliance is set as the default gateway for intra-LAN communication for two or more endpoint devices. A subnet mask of 255.255.255.255 is used to set the security appliance as a default gateway for a plurality of endpoint devices of the shared VLAN environment.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 12:
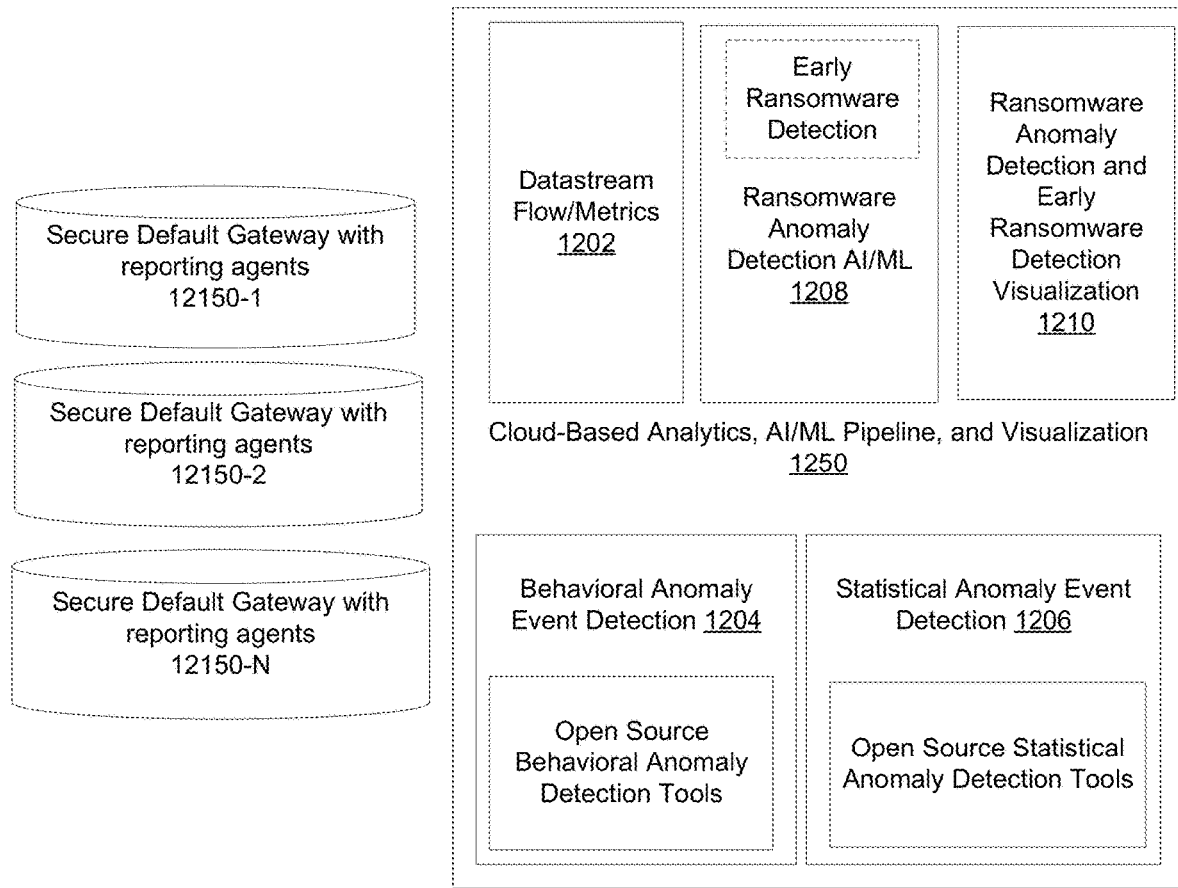
FIG. 12 illustrates an implementation of a system for early detection of ransomware in accordance with an implementation.
Figure 13:
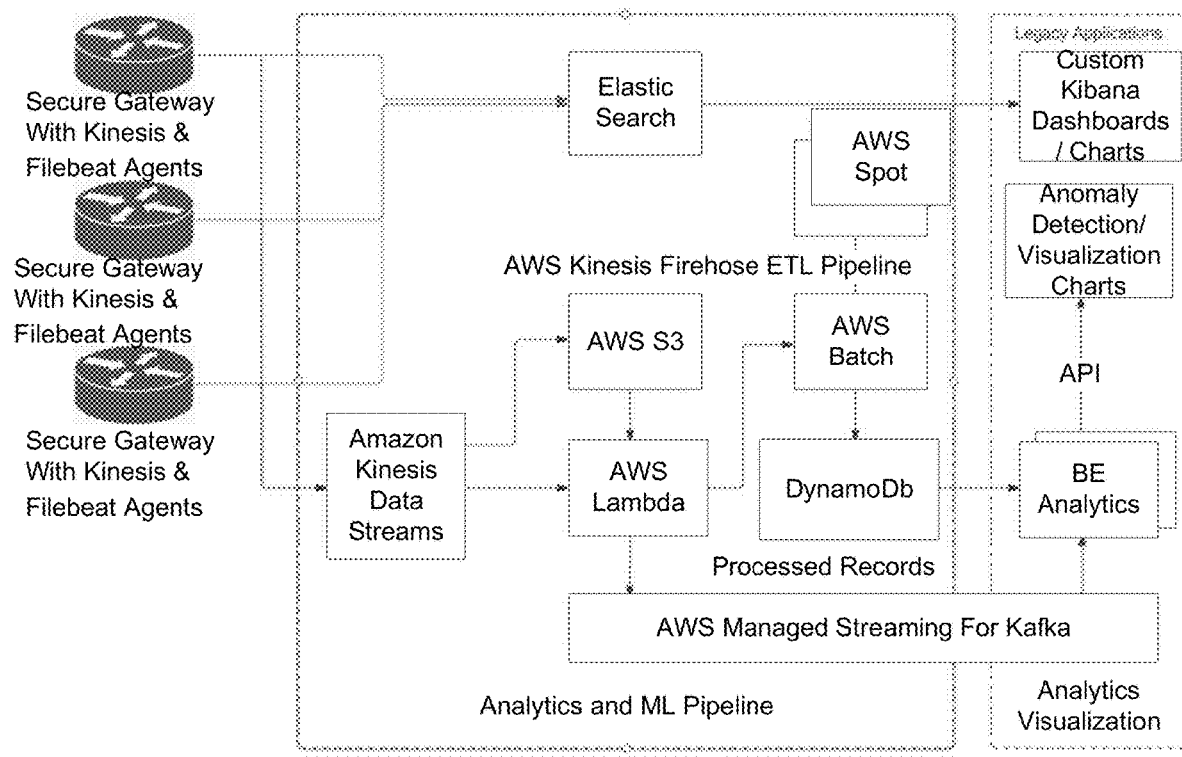
FIG. 13 illustrates an example of a cloud-based AWS implementation of the system of FIG. 12 in accordance with an implementation.
Figure 14:
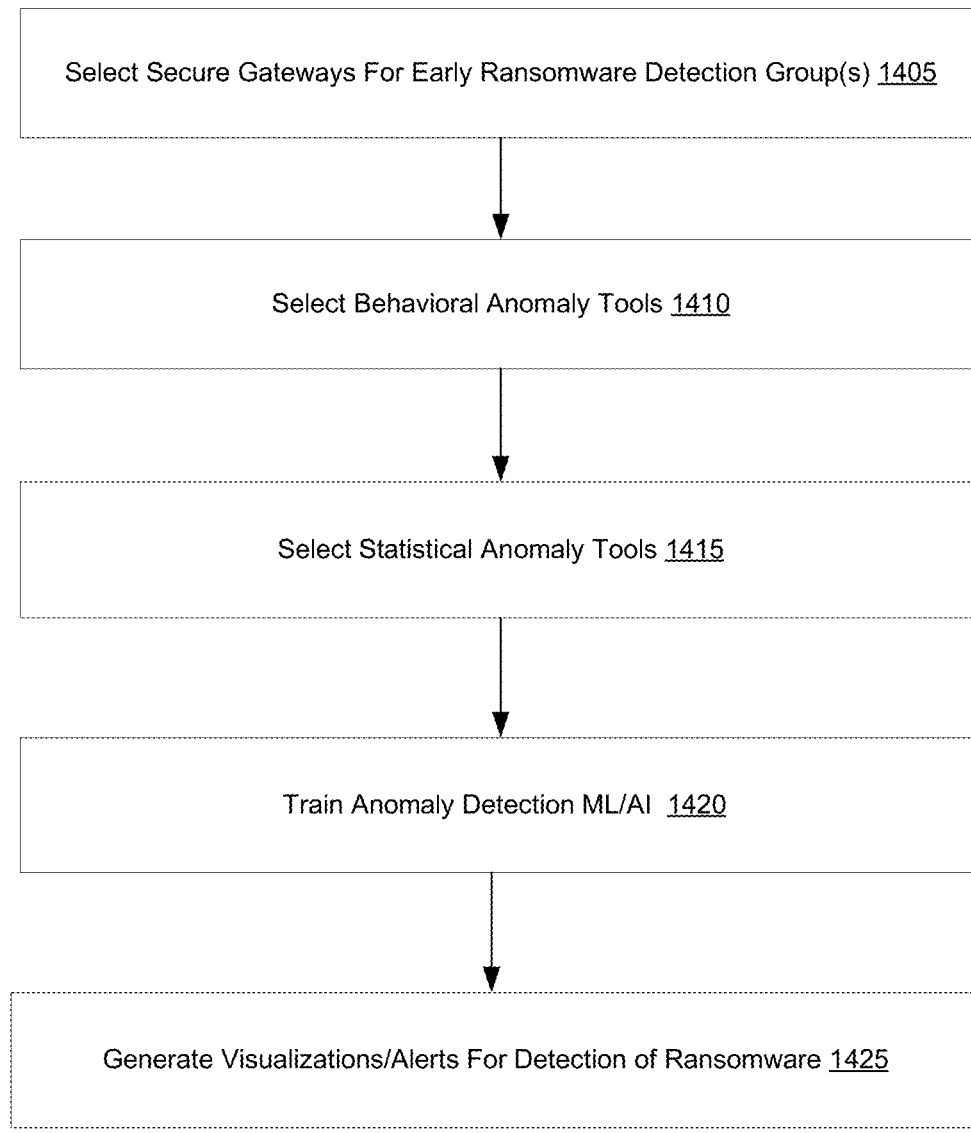
FIG. 14 is a flowchart illustrating an example of a method of early ransomware detection in accordance with an implementation.

FIGS. 2-11 describe examples of a security appliance to form secure access gateways. FIGS. 12-14 illustrate an example of system and method for performing early ransomware detection, in which each gateway may be similar to, or a variation of, the secure access gateways.

Secure Access Gateway

Figure 1:
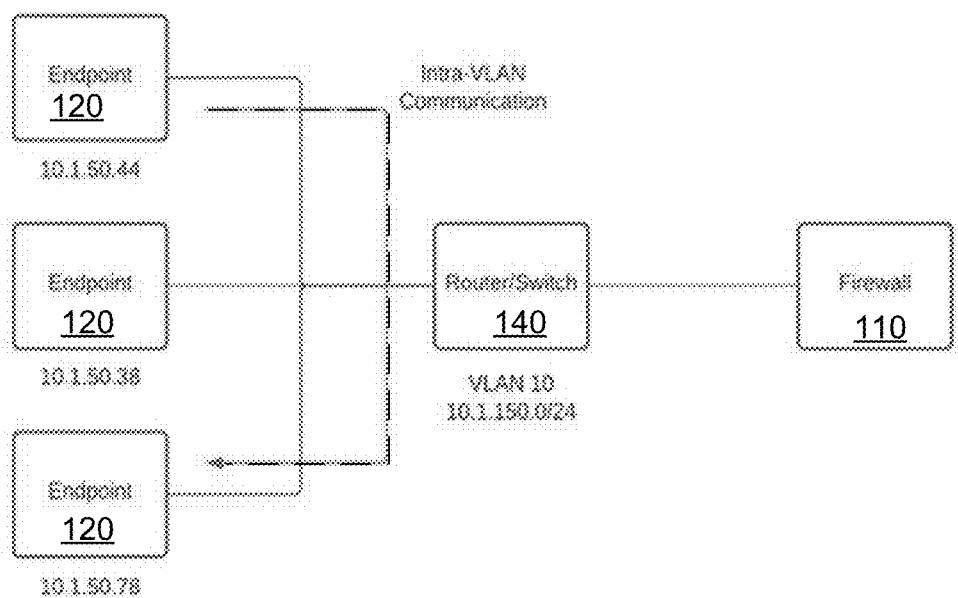
FIG. 1 is a block diagram illustrating Intra-LAN traffic in a conventional VLAN network.
Figure 2:
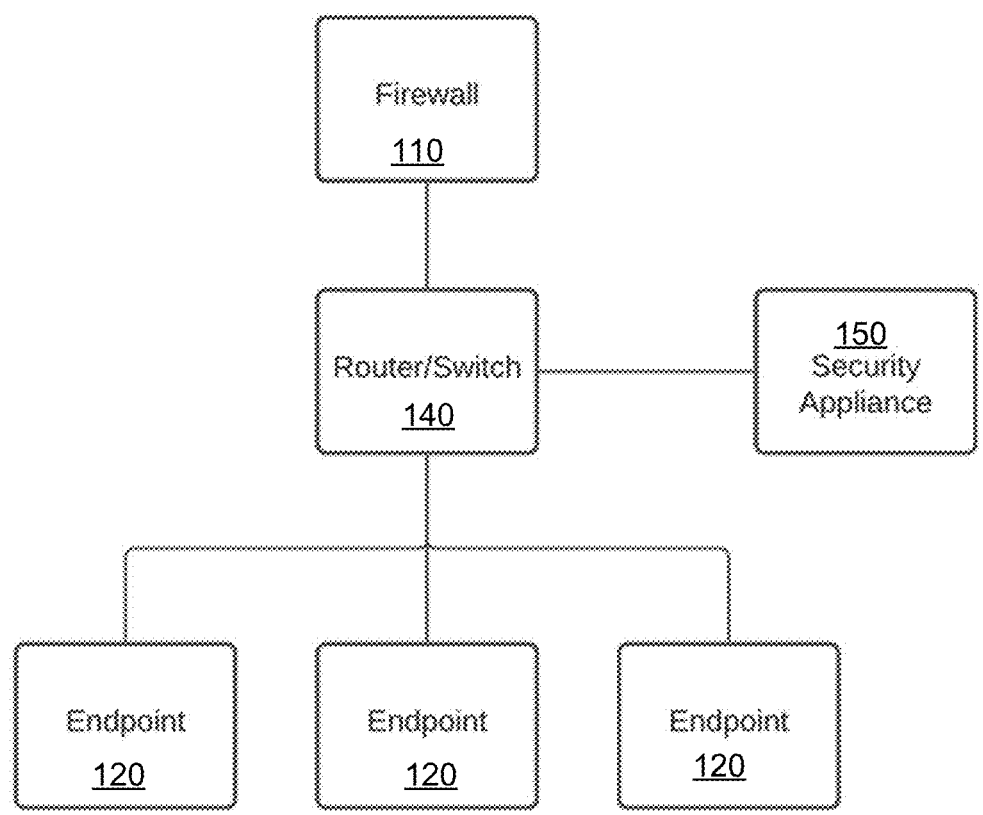
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point-to-point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) Relay responsible for relaying IP address requests to the DHCP function on the network and overwriting the subnet mask in the response to a subnet mask comprised of all ones—255.255.255.255.

When an individual endpoint 120 requests an IP address, the security appliance 150 sets the security appliance as the default gateway for the endpoint. In one implementation, the security appliance responds with a subnet comprised of all ones—255.255.255.255—and sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
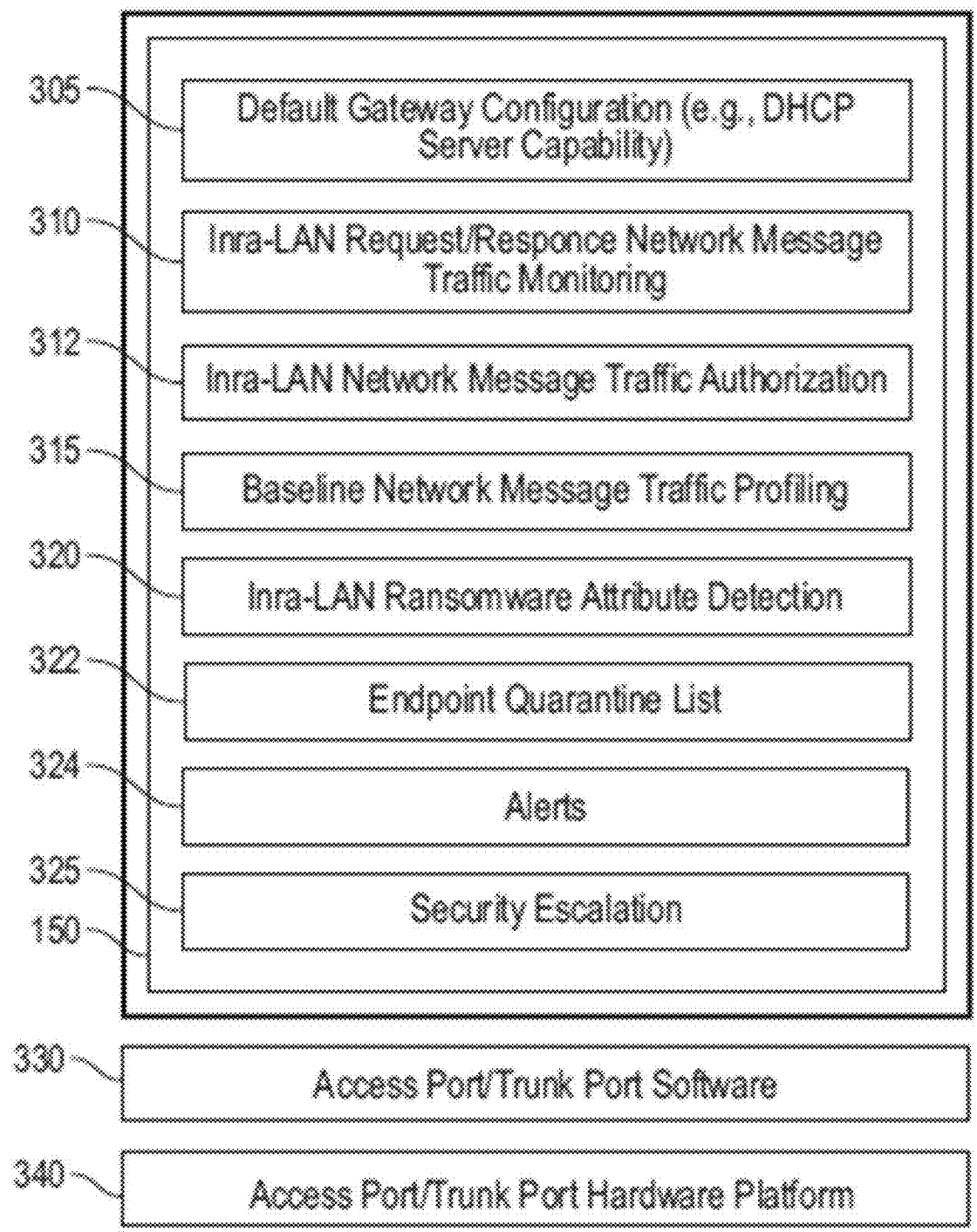
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may be implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransomware). An alert unit 324 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
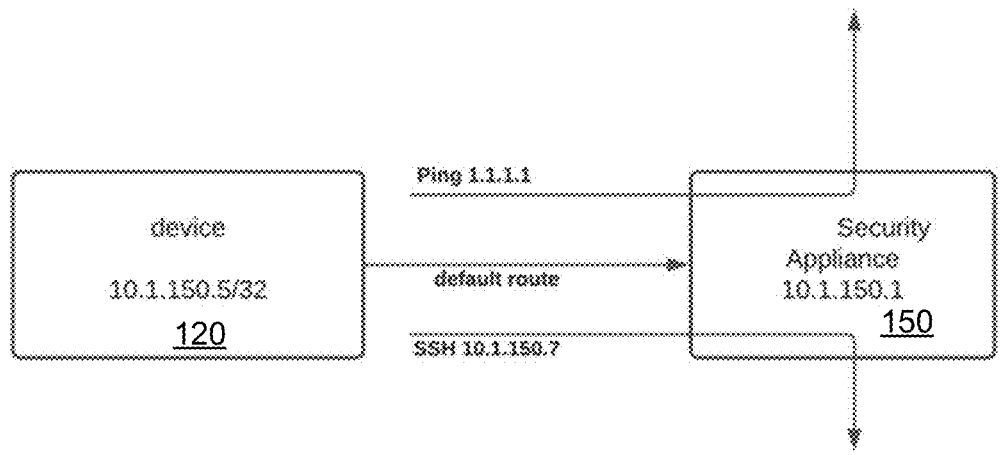
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
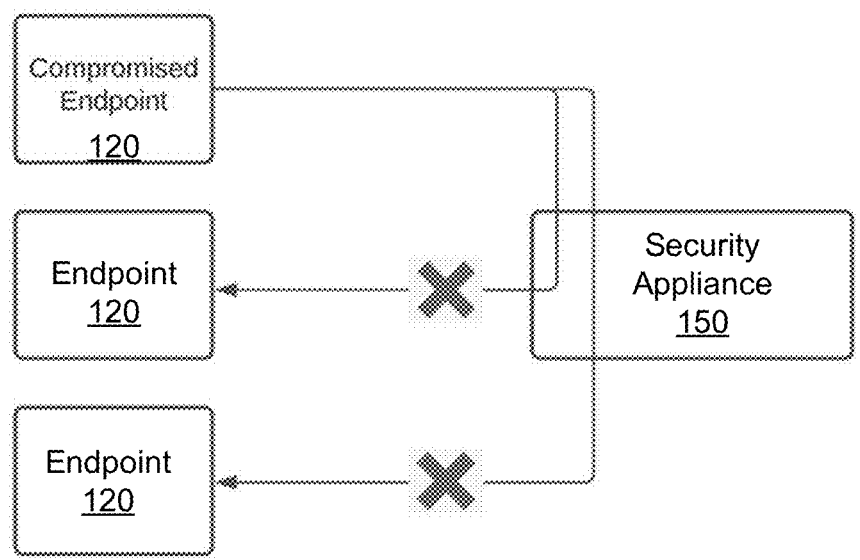
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
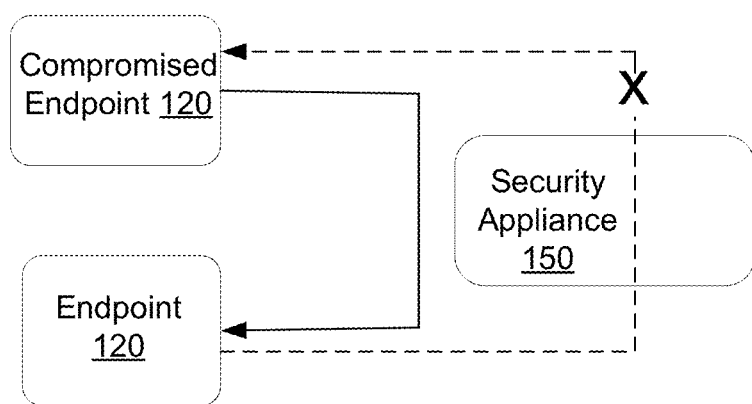
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
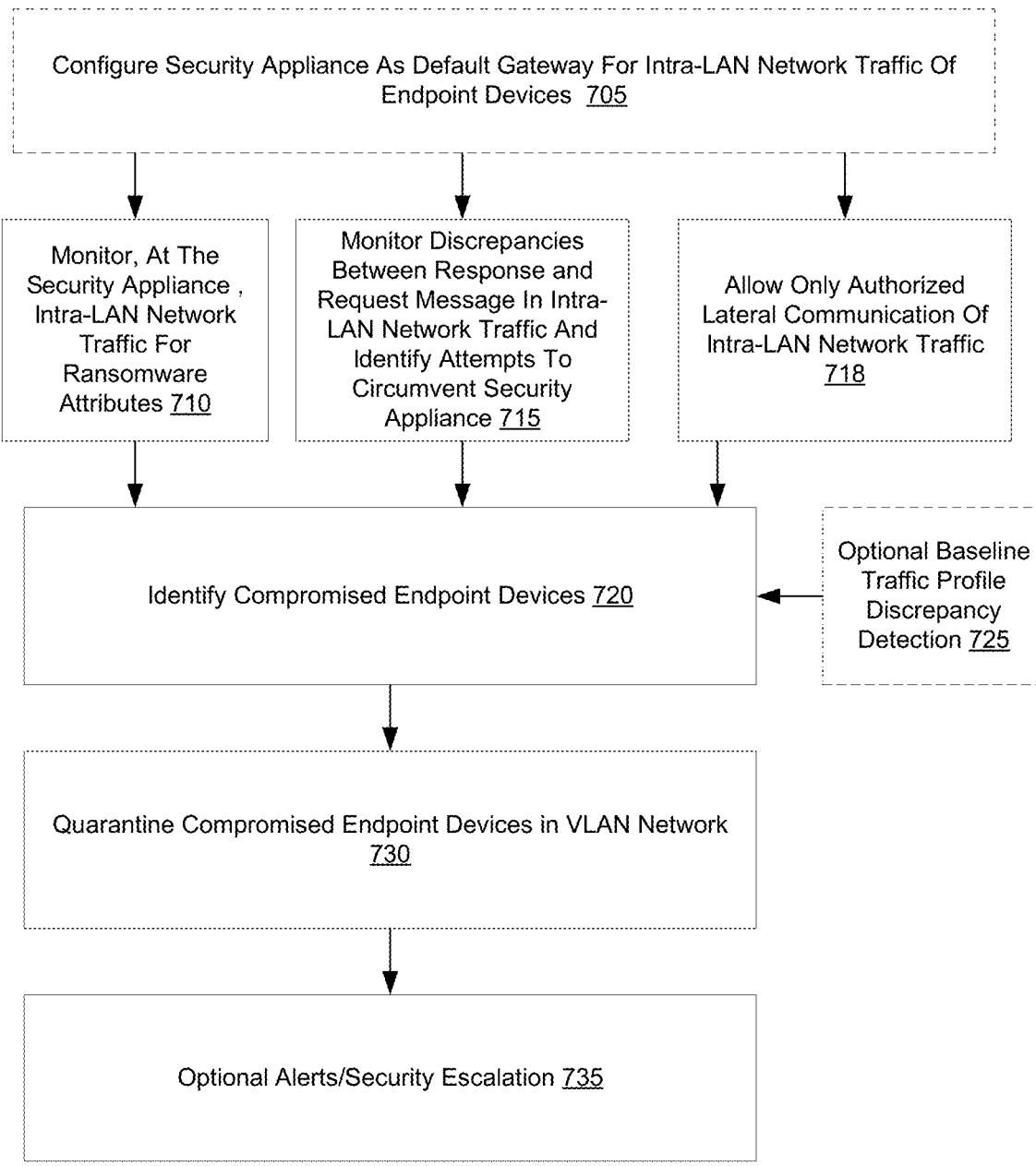
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

As previously discussed, a security appliance may be used to protect device endpoints on a shared VLAN network from lateral propagation of malware and ransomware. However, in some implementations the security appliance 150 may be implemented in different ways. In some end-use scenarios, it may be desirable to implement the security appliance to operate in combination with a conventional original DHCP server. For example, in a deployment of the security appliance to upgrade an existing VLAN network, customers may want to ensure that their original DHCP server continues to operate without any changes to it. Also, in some implementations ensuring a graceful failure mode is a key concern. For example, some customers may want assurance that there is a graceful failure mode in the unlikely event that the security appliance 150 temporarily goes down.

Figure 8:
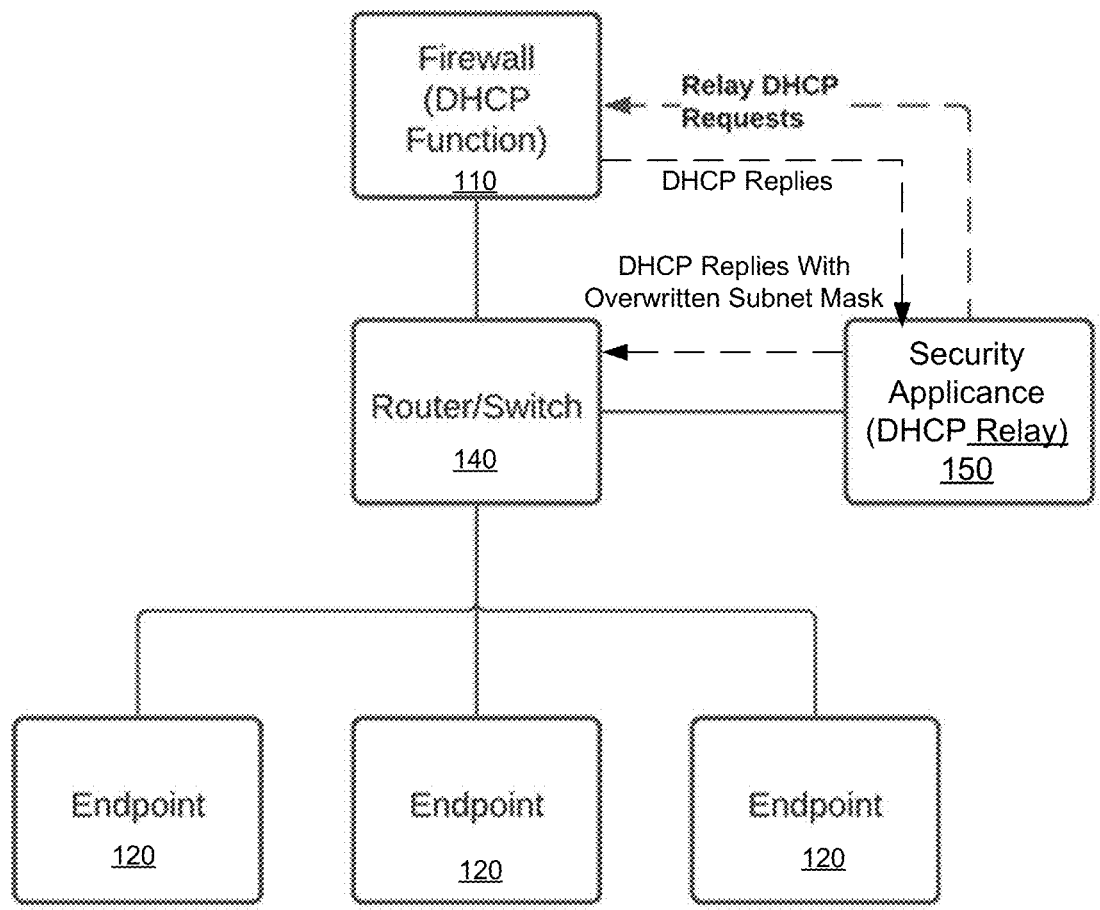
FIG. 8 illustrates an implementation of the security appliance having a DHCP relay function in accordance with an implementation.

FIG. 8 illustrates a deployment architecture in which the security appliance 150 is deployed on a trunk port on the existing router or switch. In this implementation, the security appliance 150 has a DHCP relay function and acts as a DHCP relay for the existing VLAN network. As indicated by the dashed lines, when an endpoint device 120 requests an IP address via a DHCP request, the security appliance 150 acts as a DHCP that relays the DHCP request to the original DHCP server on the network (shown as part of the Firewall function 110). When the response is received from the original DHCP server, the security appliance 150 overwrites the subnet mask in the response with a subnet mask which is comprised of all ones: 255.255.255.255. This results in the security appliance 150 configuring itself as the default gateway for the endpoint by overwriting the router/gateway property in the response. This process continues for all of the endpoints 120 in a VLAN domain. A provisioning or setup process may be optionally used to ensure that all of the endpoint devices request an IP address and use the security appliance as the default gateway.

Figure 9:
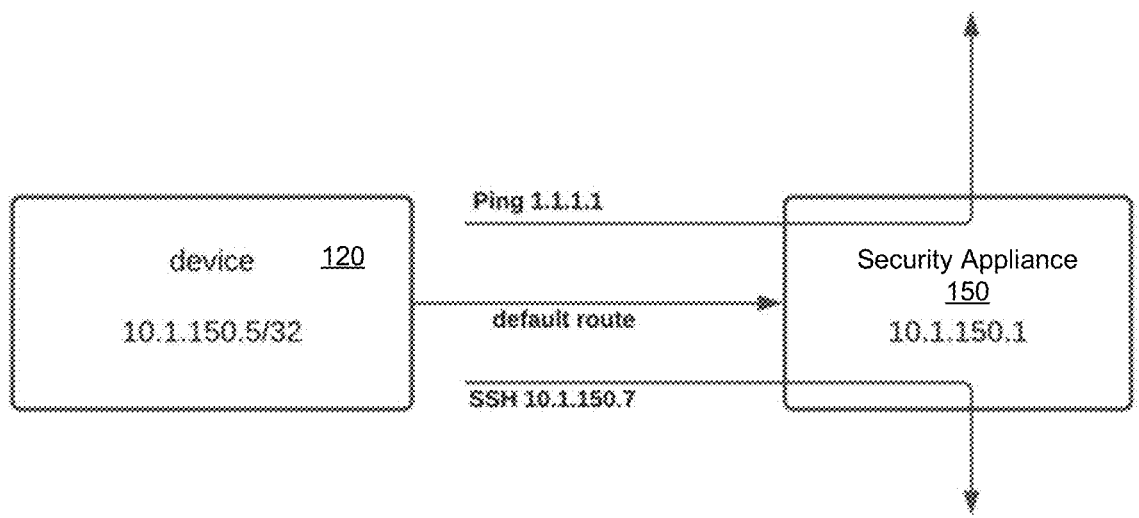
FIG. 9 illustrates a default gateway function in accordance with an implementation.

Since each individual endpoint device receives an IP address with a subnet mask of 255.255.255.255, any network communication with other endpoint devices or internet applications needs to be routed via the default gateway. From the perspective of an individual endpoint, other endpoints, and applications appear to be in a different IP network. Hence all outbound packets are sent to the default gateway as shown in FIG. 9.

Figure 10:
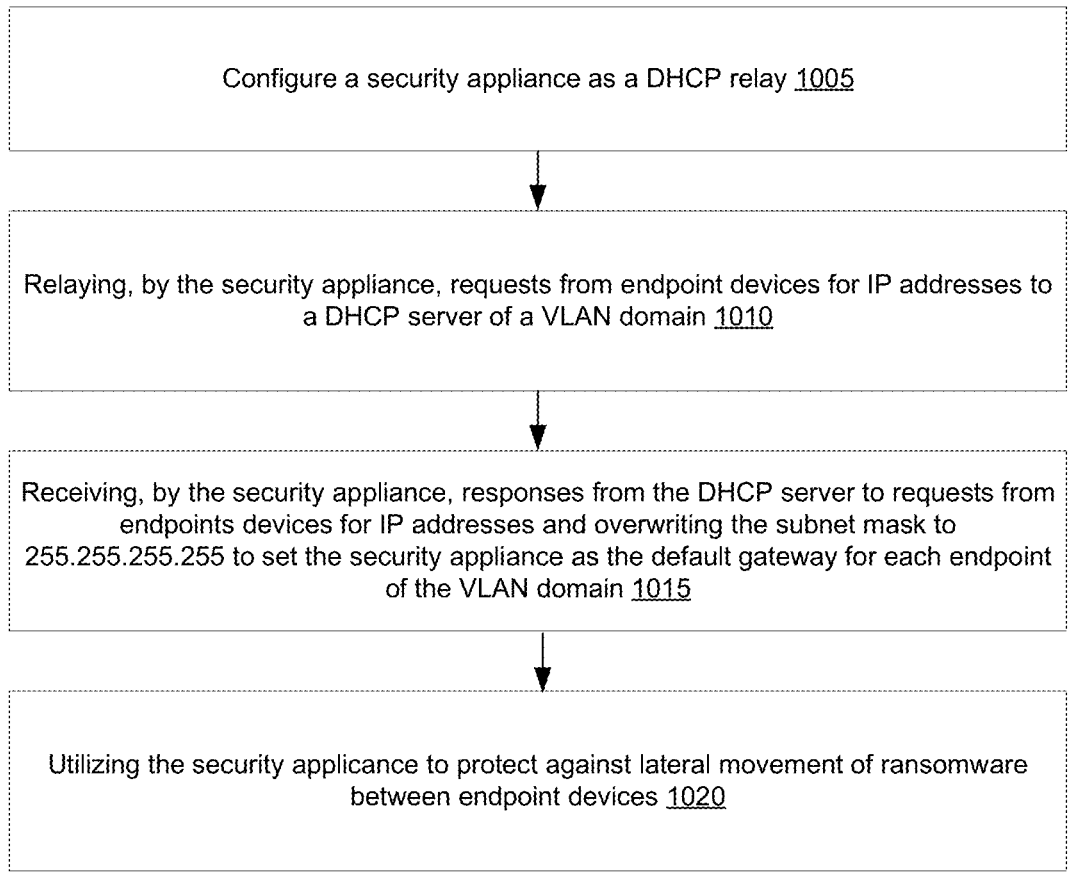
FIG. 10 illustrates a high-level flow chart of a method of using a security appliance with a DHCP relay function to protect against ransomware in accordance with an implementation.

FIG. 10 is a flowchart of a method in accordance with an implementation. In block 1005 a security appliance is configured as a DHCP relay. For example, the security appliance may include a DHCP relay function that is activated when the security appliance is deployed in a VLAN network having a firewall with a DHCP server. In block 1010, in operation the security appliance relays DHCP IP address requests from individual endpoint devices of a VLAN domain to the DHCP server. In block 1015, the security appliance receives DHCP response and overwrites the subnet mask with all ones to 255.255.255.255. This sets the security appliance as the default gateway. In block 1020, the security appliance is used to protect against lateral movement of ransomware between endpoint devices.

Figure 11:
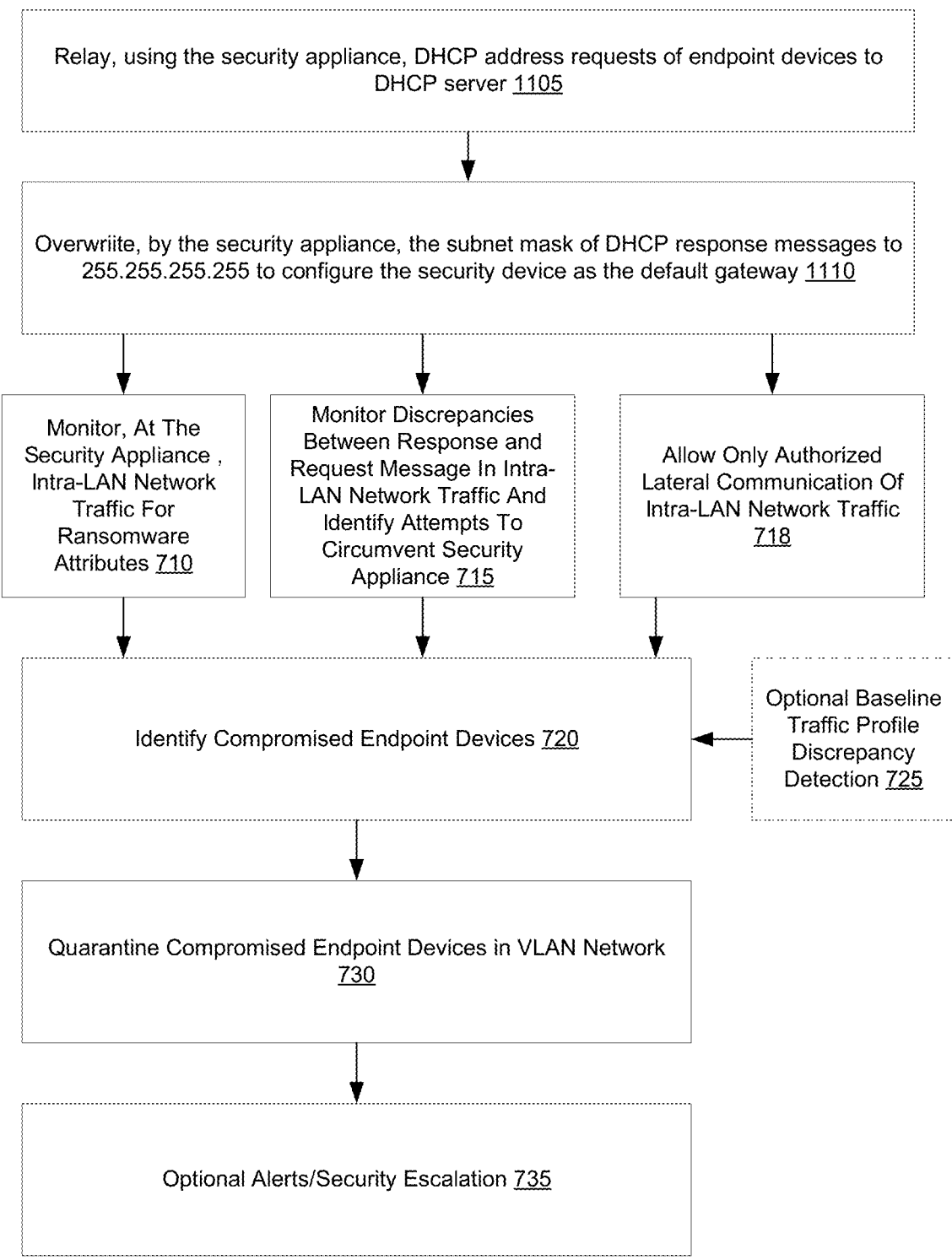
FIG. 11 is a flow chart illustrating how a security appliance with a DHCP relay function can provide a variety of layer of protection similar to that of FIG. 7 in accordance with an implementation.

As illustrated in FIG. 11, the security appliance may be used to implement features described in regard to FIG. 7. The security appliance becomes the default gateway in blocks 1105 and 1110 by virtue in the process of the security appliance relaying DHCP IP address request to the DHCP server (block 1105) and overwriting the subnet mask (block 1110) to set the security appliance as the default gateway.

The particular implementation of the security appliances in FIG. 8 to FIG. 11 increases the overall reliability of the deployment. In the unlikely scenario that the security appliance was to fail, an automated script could reconfigure the network switch so that the original DHCP server assumes the DHCP function in the network. This would ensure seamless downgrade with no downtime.

While failure of the security appliance is an unlikely scenario, ultra-high reliability and graceful failure is important in some end use applications.

Clustering of Gateways for Load Balancing and High Availability In an Enterprise Network or Industrial/OT environment, there may be a need to balance the traffic load between multiple security appliances to ensure that each security appliance receives an appropriate share of the traffic. Existing solutions for load balancing typically rely on hardware load balancers or software load balancers running on servers. However, these solutions can be expensive, difficult to manage, and may create a single point of failure. Further, these solutions typically load balance client traffic using Layer-3 or Layer-4 protocol attributes (such as the 4-tuple identifying the flow or the client IP address) and are not suited for a solution where the default gateways maintain point-to-point links between endpoints. Hence, there is a need for an efficient and cost-effective method of load balancing traffic in an environment with point-to-point links between the default gateway and endpoint devices.

Referring to FIG. 12, in one implementation, a high availability cluster 1205 of secure access gateways 1210 is illustrated with each gateway having a security appliance 150. The secure access gateways 1210 can be considered to be nodes of the high availability cluster. The cluster as a whole may have a software entity that coordinates the redistribution of traffic. In one implementation a gateway is active if it is functioning normally and able to handle message traffic in a VLAN. A gateway fails if it is not functioning normally and is unable to handle normal message traffic. For the purposes of illustrating load balancing, these two possibilities are considered, although more generally health information about a gateway could be monitored to detect gateways that are candidates for pro-active replacement.

In one implementation, each active gateway supports point-to-point links with a set of endpoint devices. Load balancing is performed. In response to a failure of an individual gateway, the traffic may be redistributed. In one implementation, load balancing is performed of network traffic across multiple security appliances that serve as default gateways in a network environment with point-to-point links between endpoints. The principle of operation of each individual gateway with point-to-point links may be similar to that previously described.

In one implementation, client endpoint devices are assigned to VLANs and an active gateway acts as a DHCP relay, assigning itself as the default gateway to the client device after receiving a DHCP response. In one implementation, multiple gateways (e.g., two or more, but more generally an arbitrary positive whole number, M) form a highly available cluster to boost throughput and resilience.

A variety of different techniques may be used to allocate traffic in the cluster. In one implementation, consistent hashing or other partitioning algorithm is used to distribute traffic from client endpoints among the different gateways that form part of the highly available cluster, with each gateway responsible for handling traffic to and from a specific range of IP addresses or clients (e.g., as illustrated, ranges of IP addresses such as IP1, IP2, IP3 . . . IPM). This ensures even load distribution and resiliency in the face of changes to the system's configuration.

In one implementation, the cluster uses the Virtual Router Redundancy Protocol (VRRP) to elect a master for a particular gateway address, with the master gateway serving all clients assigned to it. VRRP is described in Internet Engineering Task Force (IETF) publication RFC 5798. In case of failure, VRRP selects a new master, and the new node begins serving clients from the previous gateway, as well as its own clients, to avoid sudden degradation of performance. Since each VRRP instance can elect a single master, different instances of VRRP are run on different VLANs, so that mastership can be load balanced amongst cluster members. In this way each cluster member may serve as the VRRP master node for one or more VLANs.

The present invention provides a method for load balancing traffic in a network environment using Security Appliances acting as gateways. The method includes assigning client devices to one of the VLANs in the network environment and using a cluster of gateways to establish point-to-point links to the client devices. In one implementation, each respective default gateway is allocated from a set of gateway IP addresses belonging to N gateways that serve as part of the cluster. At some examples, the allocation can be performed using either a consistent hashing or a static partitioning algorithm. In one implementation, the gateway IP addresses are reserved from the available VLAN subnet pool.

When the client endpoint requests an IP address using the DHCP protocol, the gateway which is acting as the VRRP master relays the DHCP request to the DHCP server. When the DHCP server responds, the gateway overwrites the default gateway IP address and the subnet mask in the response packet. In one implementation, the default gateway is picked by computing a consistent hash of the individual gateway addresses (for those gateways participating in the high availability (HA) cluster) in a round-robin fashion (as described later). The subnet mask is set to 255.255.255.255 to establish point-to-point links between client devices.

In this way each client endpoint gets assigned a different default gateway using a consistent hashing algorithm amongst the cluster members. Subsequent traffic from these client endpoints is redirected to their respective default gateways and gets evenly distributed (or substantially evenly) amongst the cluster members.

In one implementation, consistent hashing is used to re-hash all IP addresses in a range when adding or removing gateways to help to distribute the workload evenly across all available gateways and minimize disruption to existing clients. This implementation does not depend on any partitioning algorithm.

In one implementation, a simple divide-by-N static partitioning of the available IP pool within a VLAN to all available cluster members can alternatively be used. However, this implementation may require more extensive redistribution than other approaches when a given node fails.

Aspects of how this approach handles node failures will now be discussed with regards to FIG. 13. For the purposes of VRRP, each gateway may be considered to be a node. If a cluster node were to fail, the active VRRP instances on other node (for each VLAN) will reassign all client endpoint from the failed cluster gateway to the remaining nodes. When these endpoints renew their IP addresses using the DHCP renew mechanism, they will get assigned existing/new IP addresses with the default gateway partitioned amongst the remaining active cluster nodes. Traffic which was destined to the failed cluster node will transition over to the remaining nodes. In this mechanism, performance degrades gracefully with nodes taking on more and more load as additional nodes start failing.

Some of the advantages of the cluster arrangement is that it provides a cost-effective and efficient method for load balancing traffic in a network environment using gateway nodes to provide additional security against lateral propagation of ransomware. The partitioning of client endpoints amongst available cluster members, ensures that traffic is evenly distributed between all the members. The mechanism also provides for graceful degradation of performance with nodes taking on additional load as other cluster nodes fail.

Ransomware Early Detection

As previously discussed, the secure access gateway can be used to aid against ransomware attacks. In some implementations, additional features are included to support early ransomware detection. Lateral Movement is a crucial stage in a ransomware attack as it allows the attacker to spread their impact throughout the target network. This can lead to the encryption of a larger number of files and systems, increasing the overall damage caused by the attack. If the attacker is successful in compromising multiple systems, they may be able to persist on the network even if some systems are secured or recovered, making the attack much harder to remediate. Preventing lateral movement is therefore essential in defending against ransomware attacks. By limiting the attacker's ability to move within the network, the attacker's impact can be contained and minimized. This can help reduce the number of systems and files that are encrypted, making it easier and less costly to recover from the attack.

Further, detecting early signs of a ransomware attack can greatly reduce the potential damage and allow organization to contain the spread of a ransomware attack.

Conventional Security Information and Event Management (SIEM) systems are frequently used to analyze log data and alert administrators to suspicious behavior that may indicate a ransomware attack. However, these systems can sometimes generate false positives, which are alerts that appear to indicate the presence of ransomware, but do not.

False positives can occur in a conventional SIEM for several reasons. First, there may be configuration errors: SIEM systems rely on rules and policies to detect suspicious activity. If these rules are configured incorrectly, they can generate false alerts. Second, there may be a lack of context. SIEM systems may not have access to all the information needed to determine if an event is actually a threat. For example, a high number of file deletion events could indicate a ransomware attack, but it might also be the result of normal maintenance activity. Third, some SIEM systems can generate false alerts due to normal system activity, such as software upgrades or backups. Fourth, there may be false positive data sources: Some data sources used by SIEM systems, such as intrusion detection systems (IDS), can generate false positive alerts due to limitations in their algorithms or issues with the data they use.

The high number of false positives generated by SIEM systems today have rendered these systems in-effective in detecting early symptoms of a ransomware attack in progress. This is a fundamental problem with conventional SIEM systems.

In one implementation, the secure default gateways with point-to-point links are used to provide a Zero Trust Isolation Solution with Early Ransomware Detection. This solution is based on establishing virtual point to point links between the Airgap security appliance and each endpoint which is part of the shared VLAN domain and forcing all traffic from an endpoint to traverse the security appliance as previously discussed.

In one implementation, a system and method is provided for early detection of ransomware by using Machine Learning (ML) and/or Artificial Intelligence (AI) algorithms to perform behavioral and statistical anomaly detection on enterprise network traffic in a network where the security appliance has already been deployed.

Using a combination of behavioral and statistical anomaly detection permits early detection of ransomware with an acceptable rate of false positives. The response of the behavioral and statistical anomaly detection may be selected to achieve a combination of early ransomware detection and a low rate of false positives.

FIG. 12 illustrates a high-level system architecture in accordance with an implementation. In one implementation, each secure default gateway 12150 with point-to-point links includes an agent to report to cloud-based functionalities that include cloud-based analytics, an AI/ML pipeline and visualization tools 1250.

A data stream flow metrics tool 1202 may be included to monitor and identify network traffic flows for one or more gateways 12150. At least one anomaly event detection engine is provided to analyze network traffic for one or more gateways 12150 and generate anomaly event data for further analysis.

In one implementation, a behavioral anomaly event detection engine 1204 includes one or more behavioral anomaly detection tools. As an example, a variety of different open source or proprietary tools may be selected from that each detect at least one behavioral pattern indicative of a behavioral anomaly indicative of ransomware.

In one implementation, a statistical anomaly event detection engine 1206 includes one or more statistical anomaly detection tools. For example, a variety of different open source or proprietary tools may be used.

An anomaly detection AI/ML engine 1208 may optionally be provided to support an additional layer of analysis and ransomware anomaly detection. In one implementation, the AI/ML engine 1208 analyzes the output of the behavioral anomaly event detection engine 1204 and the statistical anomaly event detection engine 1206. For example, a particular type of ransomware attack may have associated with it one or more behavioral anomaly events and may also (in some cases) have one or more statistical anomaly events. There, in some cases a ransomware attack may go through various phases such that some types of anomaly event data (e.g., statistical anomaly event data) occur before other types of anomaly event data.

The anomaly detection AI/ML engine 1208 may analyze all of the available anomaly event information to identify individual anomalies and combination of anomalies indicative of ransomware anomalies.

Anomaly detection AI/ML engine 1208 AI/ML may be trained, for example, to perform multi-factor classification within selected predicted confidence levels and predicted false error rates. A ransomware attack may have different phases. As a result, some types of statistical anomalies in network traffic may occur before behavioral anomaly patterns are detected. Also, in theory some types of behavioral anomaly patterns may be detected before others. This means that in some scenarios a detection of a possible early phase ransomware attack may be possible before all the anomaly event data of different types is available to detect a ransomware attack at a later stage. In the most general case, the AI/ML engine 1208 may classify the available anomaly event data to support different types of alerts for an operator.

An anomaly detection visualization module 1210 may generate visualizations/alerts including, but not limited to, graphs and alerts for anomalies. The anomaly detection visualization module 1210 may generate visualizations based on the raw anomaly event detection data alone and from the output of the anomaly detection AI/ML 1208 (if used). This may include, if desired, generating different types of alerts based on the currently available anomaly event detection data. For example, in some cases statistical anomalies in traffic may be detectable before anomalies in behavioral patterns. Also, some type of anomalies in behavioral patterns may be detectable before other types of behavioral patterns, depending on the nature of the ransomware attack vector.

Some operators may desire to be more proactive than others in terms of being alerted to potential ransomware attacks to increase their capability to slow/stop the spread of ransomware. Some operators may desire, for example, alerts of potential early-stage ransomware attacks even though only partial information is available (reducing the confidence level that there is an active ransomware attack). Operators may have different preferences for conditions/confidence levels that generate an alert of a potential ransomware attack. For example, alerts may be classified by potential level of threat (e.g., Red, Yellow, Green). Alerts may also include summary information regarding the type of anomalous event data detected (e.g., statistical anomalies alone, statistical anomalies and behavioral anomalies, or behavioral anomalies alone).

FIG. 13 illustrates an example of an Amazon Web Services® (AWS) implementation). The secure gateways are deployed in customer enterprise/industrial/OT (operational technology) environments and establish a network with point-to-point links with endpoints and servers (by handing out a prefix of all-ones i.e., 255.255.255.255). This results in the secure gateway becoming the default gateway for each endpoint within this environment and all east-west (between endpoints/servers) and north-south (between endpoints/servers/internet destinations) to traverse the gateway.

In one implementation, AWS Kinesis and Filebeat Agents running on these secure gateways collect this network traffic and stream them continuously to AWS Kinesis Data Streams running as part of a Cloud deployment. In one implementation, a copy of this data is also streamed to Elasticsearch (running as part of a Cloud based ransomware detection solution), for the purposes of displaying flows/metrics and custom Kibana dashboards.

In one implementation, behavioral anomaly detection is performed using Zeek. Zeek is an Open-Source Network Security Monitoring Tool (see https://zeek.org/) to inspect network traffic that transits through the secure gateway on point-to-point links between endpoints. The Zeek architecture has an event engine and a policy script interpreter. Network packets are received by the event engine, which generates events. That is the event engine reduces an incoming packet stream into a series of higher-level events. The policy script interpreter generates logs and notifications from the events. The script interpreter executes a set of event handler written in a scripting language to implement a policy. In one implementation, the network traffic data is analyzed to match traffic behaviors and measure their correlation with attack patterns observed in prior ransomware attacks.

In one implementation, the behavioral anomaly detection implemented by Zeek includes detecting the behavioral pattern of the EternalBlue SMBv1 (Server Message Block) vulnerability exploit used by popular ransomware attacks. In one implementation, a set of SMBv1 protocol invariants is used that encapsulates techniques used by each Eternal exploit in unpatched Windows Systems. In one implementation, this behavioral detection is based upon the detection package provided by the following Zeek package: https://github.com/0x13x1/zeek-EternalSafety.

In one implementation, once a match to a behavioral pattern is found, the Zeek framework outputs a network security event into a file called 'notice.log'. The gateway then publishes this detected security event to the AWS Kinesis Data Stream, where the cloud-based AI/ML framework analyzes this event further. If this is determined to be a credible threat/alert, this event is sent to the Anomaly Detection/Visualization Charts and an event is generated to alert the operator. In this example, the AI/ML framework supports performing an additional stage of AI/ML analysis to support early detection of ransomware with a low rate of false positives. For example, in the most general case, a variety of different behavioral analysis tools may be used, each looking for different behavioral patterns of ransomware. In theory, a particular type of ransomware may exploit a particular type of vulnerability and have associated with it a particular behavioral pattern. However, more generally a particular type of ransomware may exploit more than one particular type of vulnerability. Also, a particular type of ransomware may have associated with it more than one behavioral pattern.

In one implementation, a form of statistical anomaly detection is used that is based on volumetric data analysis to identify statistical anomalies in the input traffic stream. For example, assume a Windows Operational System sends probes to a PLC controller periodically every 30 minutes with packets of size 2048 bytes each time. If a sudden burst of unusual traffic activity is detected, with packets of size much larger than 2048 bytes, and on network ports which were previously not used for network communication, then this signals a statistical anomaly. Such statistical anomalies, based on volumetric analysis, could be indicative of a Ransomware Attack in progress.

In one implementation, to implement volumetric based analysis and to leverage machine learning (ML) analysis on this data, the network traffic data is streamed to the AWS Kinesis Data Stream. At this point this data is then published to a series of batch jobs which run a Hierarchical Density Based Spatial Clustering Amidst Noise (HDBSCAN) analysis. HDBSCAN is a well-known clustering algorithm (See e.g., https://hdbscan.readthedocs.io/en/latest/how_hdbscan_works.html#:~:text=HDBSCAN%20is%20a%20clustering%20algorithm,in%20the%20stability%20of%20clusters). The HDBSCAN clustering algorithm is used to cluster the data based on traffic attributes. For example, a set of OT/manufacturing systems communicating with each other would form well-defined clusters of communication.

When a ransomware attack is in progress, the attacker typically does a network scan to identify vulnerable systems and then proceeds to exploit them. This network scan and further lateral movement can trigger a statistical anomaly alert which is then analyzed and used to generate an alert for the operator. Note that this is an example of early ransomware detections. Such early ransomware detection may be used to generate an alert (with a lower level of confidence of a ransomware attack) than if there was also detected data for additional anomalous behavioral patterns. As previously discussed, in some implementation an operator/administrator may configure different types of alerts and visualization.

FIG. 14 illustrates an example method. In block 1405, gateways are selected for ransomware detection. For example, while ransomware detection may be performed for an individual secure gateway, more generally an enterprise may have a large number of gateways across different parts of their networks. In block 1410, individual behavioral anomaly tools are selected. For example, any tool to detect the behavioral pattern of ransomware may be selected. Also, more than one tool may be selected. There may be an arbitrary number of selected behavioral anomaly tools. In block 1415, statistical anomaly tools are selected. In the most general case, there may be an arbitrary number of different statistical anomaly tools utilized. In block 1420, an AI/ML anomaly detection engine is trained to perform additional layer of analysis. For example, there may be training data to generate the AI/ML model to perform multifactor classification and validation to verify the accuracy of the AI/ML model to provide a desired response. As one example, the AI/ML model may perform multifactor classification, taking the available behavioral anomaly event data and the available statistical anomaly event data and classifying the combines data to generate data to identify possible early phase ransomware attacks (with a first desired level of confidence) as well as identifying later phase ransomware attack (with a second desired level of confidence), such as after behavioral anomaly event data is available. In block 1425, visualizations and alerts are generated. This may include configuring visualization and alerts for an operator.

Alternate Implementations

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method for ransomware protection in a Virtual Local Area Network (VLAN), comprising:
    deploying at least one gateway with each gateway having point-to-point links with a plurality of client endpoint devices, with each gateway having a security appliance acting as a DHCP relay assigning itself as the default gateway to a plurality of client endpoint devices in a VLAN after receiving a DHCP response wherein the security appliance overwrites a subnet mask to 255.255.255.255 to set the security appliance as a default gateway for the plurality of endpoint devices of the VLAN; and
    sending a copy of message traffic of the gateway to an early ransomware detection system to analyze network traffic from each of the at least one gateway for behavioral anomalies and statistical anomalies.

2. The method of claim 1, wherein the early ransomware detection system is cloud-based.

3. The method of claim 2, wherein analyzing statistical anomalies of network traffic is performed to detect unusual traffic associated with at least one phase of a ransomware attack.

4. The method of claim 2, wherein the behavioral anomalies include at least one behavioral pattern associated with ransomware.

5. The method of claim 2, further comprising training and deploying a machine learning engine to perform an additional layer of analysis on statistical anomaly event data and behavioral anomaly event data.

6. The method of claim 5, wherein the machine learning engine performs multi-factor classification on features in statistical anomaly event data and behavioral anomaly event data.

7. The method of claim 5, wherein the machine learning engine is trained to perform early ransomware detection.

8. The method of claim 2, further comprising generating visualizations and alerts of an early ransomware attack.

9. A method for ransomware protection in a Virtual Local Area Network (VLAN), comprising:
    deploying a plurality of gateways with each gateway having point-to-point links with a set of respective client endpoint devices assigned to each gateway;
    each gateway having a security appliance acting as a DHCP relay assigning itself as the default gateway for the gateway to a plurality of client endpoint devices in a VLAN after receiving a DHCP response wherein the security appliance overwrites a subnet mask to 255.255.255.255 to set the security appliance as a default gateway for the plurality of endpoint devices; and each gateway sending a copy of message traffic of the gateway to an early ransomware detection system to analyze network traffic for behavioral anomalies and statistical anomalies.

10. The method of claim 9, wherein the early ransomware detection system is cloud-based.

11. The method of claim 10, wherein analyzing statistical anomalies of network traffic is performed to detect unusual traffic associated with at least one phase of a ransomware attack.

12. The method of claim 10, wherein the behavioral anomalies include at least one behavioral pattern associated with ransomware.

13. The method of claim 10, further comprising training and deploying a machine learning engine to perform an additional layer of analysis on statistical anomaly event data and behavioral anomaly event data.

14. The method of claim 13, wherein the machine learning engine performs multi-factor classification on features in statistical anomaly event data and behavioral anomaly event data.

15. The method of claim 13, wherein the machine learning engine is trained to perform early ransomware detection.

16. The method of claim 10, further comprising generating visualizations and alerts of an early ransomware attack.

* * * * *